June 25, 1940.  A. SOLTAN  2,205,443
CEMENTING MACHINE
Filed Sept. 30, 1938
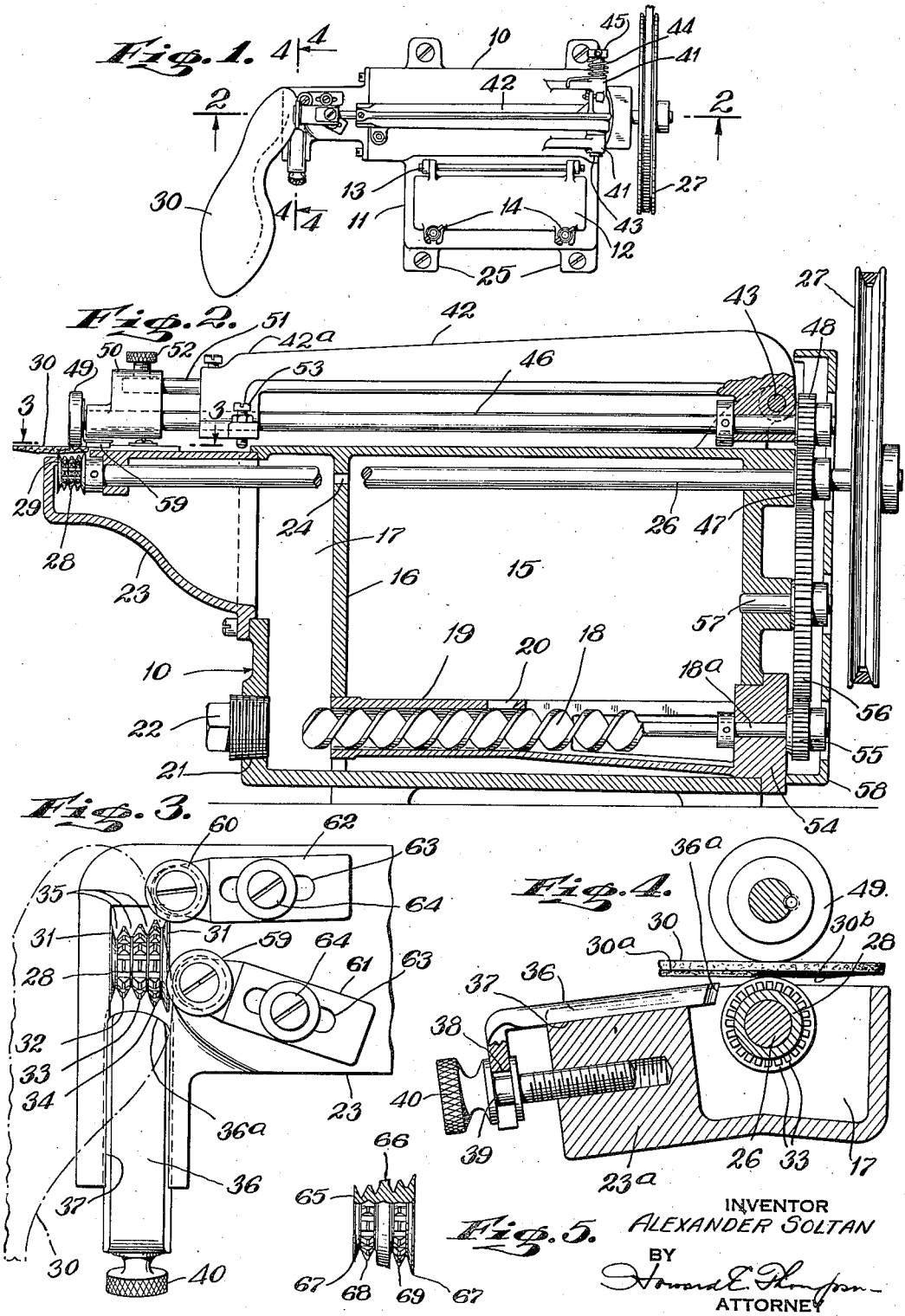
INVENTOR
ALEXANDER SOLTAN
BY
Howard E. Thompson
ATTORNEY Patented June 25, 1940

2,205,443

UNITED STATES PATENT OFFICE 2,205,443

CEMENTING MACHINE

Alexander Soltan, Elmhurst, N. Y., assignor of one-half to Percy W. Valentine, Brooklyn, N. Y.

Application September 30, 1938, Serial No. 232,553

8 Claims. (Cl. 91—51)

This invention relates to machines for applying cement to workpieces of various kinds and classes and particularly in laying a ribbon of cement along and adjacent the peripheral edge portion of an article of any desired contour to facilitate cementing such article to another part or member; and the object of the invention is to provide a machine of the character described which is adapted for use in the application of cement to one surface of the sole of a shoe in the process of manufacturing shoes; and more particularly in the provision of a machine of this type for automatically feeding the sole through the machine in the application of the cement thereto; a further object being to provide a machine of the class described comprising a cement applicator roller or element and a backing or pressure roller employed for firmly supporting a workpiece in engagement with the applicator roller with means for positively driving said application roller to feed a workpiece through the machine; a further object being to provide adjustable guide rollers arranged in spaced relation to each other and at different positions with respect to the transverse plane of the feed and applicator roller so as to guide the workpiece automatically in the feeding thereof through the machine to lay a ribbon of cement in predetermined spacing and in substantially parallel relation to the peripheral edge of the workpiece; a further object being to provide means for maintaining a predetermined level of cement with respect to said feed and applicator roller and to which the same is exposed to provide a constant delivery of cement to the workpiece; a still further object being to provide means adjustable with respect to the feed and applicator roller for regulating the amount of cement applied to the workpiece, said means operating as a wiper for removing surplus cement from the applicating and feed roller prior to engaging the workpiece; and with these and other objects in view, the invention consists in a machine of the class and for the purpose specified which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a plan view of a machine made according to my invention on a very small scale to illustrate the general arrangement of parts.

Fig. 2 is a longitudinal sectional view substantially on the line 2—2 of Fig. 1, but showing a roller supporting arm for the most part in side elevation.

Fig. 3 is an enlarged plan view of a part of the construction shown in Fig. 2 as viewed substantially on the line 3—3 of Fig. 2.

Fig. 4 is a partial section on the line 4—4 of Fig. 1 on an enlarged scale; and, Fig. 5 is a detail view of a modified form of applicator and feed wheel which I employ.

In the accompanying drawing I have shown for the purpose of illustrating one method of carrying my invention into effect, a machine designed primarily for use in applying cement to the sole part of a shoe in the process of manufacturing shoes. However, it will be understood that by slight variations in the machine, the same may be used for the application of fluids or plastic or semi-plastic compounds to workpieces of any kind or description fed through the machine in the manner set forth.

For the purpose of illustrating one method of carrying my invention into effect, I have shown at 10 the casing of a machine having an offset portion 11 provided with a large opening at the top thereof which is closed by a door 12 hinged as seen at 13 and clamped in position as seen at 14; the door facilitating the placement of cement or other material used in the machine within the chamber 15 thereof. At one end of the casing is arranged a partition wall 16 which subdivides the chamber 15 from a supplemental feed chamber 17 into which cement from the chamber 15 is fed by a screw pump 18 operating in a cylinder 19 arranged within the bottom of the chamber 15 and open at the top as seen at 20 to adapt the cement to the feed screw. A large aperture 21 is provided in the casing and is closed by a plug 22 to control the insertion and removal of the feed screw as will be apparent.

The feed chamber 17 is partially formed by an outwardly extending housing portion 23 as clearly seen in Fig. 2. At 24 is shown an overflow passage adjacent the top of the partition wall 16 so as to maintain a predetermined level of the cement in the chamber 17 and permit the excess cement pumped into the chamber 17 to be returned to the chamber 15. The size or number of the overflow apertures 24 may be consistent with the consumption of the cement by the feed roller employed and the pumping action of the screw 18. The bottom of the casing is provided with projecting apertured feet 25 for securing the casing to a suitable bench, table or other support.

Supported in the upper portion of the casing 10 and also in the housing 23 is a main drive shaft 26 which projects through one end of the casing and has a drive pulley or other driving means 27 secured thereto whereby the shaft may be driven from any suitable power output. On the other end of the shaft is secured the applicator and workpiece feed wheel 28 which is submerged in the cement in the chamber 17 a predetermined degree; the upper portion of the wheel 28 operating in an opening 29 in the upper surface of the housing 23 so as to engage the lower surface of a workpiece 30 adjacent peripheral edges thereof in the application of a strip or ribbon of cement to said surface.

The wheel 28 is bounded at its sides in circumferential continuous and sharply pointed bands 31 intermediate which are three circumferential series of bevelled teeth 32, 33, and 34, forming between each other and the bands or flanges 31 circumferential grooves 35 in which cement will be used in the rotation of the wheel as well as between the circumferentially spaced teeth in the series 32, 33, and 34, as will appear from a consideration of Fig. 4 of the drawing, in which the teeth 33 are shown. It will thus be seen that said teeth operate in a fashion as paddles for picking up and carrying the cement on the surface of the feed wheel for application to the undersurface 30a of the workpiece 30 as is diagrammatically illustrated by the shaded portion at 30b in Fig. 4 of the drawing. It will be apparent that the thickness of the lay of cement upon the workpiece is exaggerated in Fig. 4 and in applying the same to a leather sole, a substantial portion of the cement will extend into the material of the sole by saturation.

Many different angularities in the cross-sectional contour of the applicator wheel may be provided in producing different results or applications of the material upon the workpiece. In the present illustration, as seen in Figs. 1 to 4 inclusive, the band or flange 31 adjacent the peripheral edge of the workpiece is of greater diameter than the other band or flange 31, whereas the series of teeth 33 are of such diameter as to be arranged inwardly of a line joining the outer edges of the series of teeth 32 and 34, so that a greater application of cement will take place centrally of the wheel 28 than at the points where the teeth 32, 34, are located. All of the series of teeth are within the tapered surface of the wheel 28; that is to say, the tapered line formed between the large and small diameter flanges 31. The flanges 31 operate to define a limit of travel or spreading of the cement on the workpiece by forming slight indentures therein which check the lateral spreading of the cement and form a more or less true and even ribbon deposit of the cement on the workpiece.

The lay of the cement on the workpiece is also controlled by a wiper blade 36 which is supported in a recess 37 in an enlarged extension 23a of the housing 23 as seen in Fig. 4 of the drawing. The wiper 36 has a forked end 38 engaging a reduced collar portion 39 on a milled screw 40 which is adjustably supported in the body 23a in adjusting the wiper 36 or the edge portion 36a thereof toward and from the periphery of the wheel 28. The socket 37 is of dovetail cross-sectional form and the blade 36 is of similar cross-sectional form to retain the same against vertical displacement and so as to withstand the pressure of the cement which may be drawn upwardly against the lower surface of the wiper as will be apparent.

Pivotally supported in suitable bearings as at 41, note Fig. 1, is a long arm 42, the pivot pin 43 of which extends beyond one of the bearings 41 and a coil spring 44 has one end secured to a collar 45 on the pin and the other end to the adjacent bearing so as to normally support the free end portion 42a of the arm 42 in a depressed position. Mounted in connection with the arm 42 is a shaft 46 which is geared to the shaft 26 through gears 47, 48, as clearly seen in Fig. 2 of the drawing. It will be understood that sufficient clearance will be provided between the teeth of the gears 47, 48 to compensate for the very slight swinging movement of the arm 42. It will also be understood that only slight movement is required for the backing or workpiece supporting roller 49 which is arranged at the free end of the shaft 46 and keyed thereto.

The roller 49 is coupled with a block 50 which is adjustably supported on a stub shaft 51 by means of a set screw 52 in regulating the position of the roller 49 with respect to the roller 28 in controlling engagement and feed of the workpiece 30 arranged between said rollers. Adjustably supported at one side of the end portion 42a of the arm is a stop screw 53 which limits the downward movement of the arm with respect to the top of a casing to maintain the roller 49 always in spaced relation to the roller 28 when the machine is not in use, or in other words, when a workpiece is not disposed between these rollers.

The screw pump 18 has a reduced shaft extension as indicated at 18a arranged in a suitable bearing 54 in the casing 10. Projecting outwardly through said bearing and secured thereto is a pinion 55 which meshes with a large gear 56 freely rotatable on a stub shaft 57 supported in the casing and also meshing with the gear 47 to provide for the drive of the screw 18. All of the gearing is arranged in a suitable housing 58 secured in any desired manner to the side of the casing 10 leaving the drive pulley or other driving means 27 freely exposed as is clearly illustrated in Figs. 1 and 2.

I also employ two workpiece guide rollers in the form of freely rotatable flanged wheels 59 and 60 supported upon adjustable plates 61 and 62, each having elongated slots or apertures as at 63 through which are passed screws 64 which extend into the top wall of the housing 23 and form means for adjusting the position of the rollers 59 and 60 toward and from the wheels 28, 49 to arrange said guide wheels in any desired position with respect to said wheels and the axis of revolution thereof to provide a desirable guide of the workpiece through the machine in operating upon the workpieces 30. For example, in the form of a sole of a shoe of the type and kind diagrammatically illustrated in Fig. 1, the roller 59 will be arranged just forwardly of the axial center of the wheels 28, 49, whereas the wheel 60 will be arranged rearwardly thereof and in a position arranged near the transverse center of the wheel 49. In other words, the two wheels are in different relationship with respect to the transverse dimensions of both wheels 28 and 49 as clearly represented in Fig. 3 of the drawing. In this way the workpiece in addition to being automatically fed through the machine by the operation of the rollers 28 and 49 is guided in this operation by the engagement of the peripheral edge of the workpiece, which is of irregular contour, with the two guide rollers 59 and 60. In this way a ribbon deposit of the cement will be arranged on the lower surface of the workpiece in parallelism with the peripheral edge thereof.

It will be understood that the normal tendency of feed of the workpiece between the rollers 28 and 49 is set in the direction of rotary travel of said rollers. However, this operation is interrupted by the engagement of the peripheral edge of the workpiece with the roller 60 which moves the workpiece to the left thus maintaining the roller 59 at all times in engagement with the uncurved edges of the workpiece, for example at the instep of the sole. It will also be understood that the taper of the wheel also aids in accomplishing the desired result and operates to move the peripheral edge of the workpiece faster than the inner portions of the workpiece especially when the contour is irregular such as that of a sole. It will thus be seen that after placing the sole in position by hand, the machine will automatically operate to feed the workpiece unsupported by hand through the machine to lay the cement ribbon throughout the entire peripheral edge of the sole, after which the workpiece may be removed by simply raising the arm 42 by hand or in any other desired manner.

With different types of workpieces the relative position of the guide rollers 59 and 60 may be changed and when operating upon straight edged workpieces, these two rollers will be maintained in alinement with each other, and the wheel 28 may have a flat rather than a bevelled surface.

The wiper blade 36 in addition to controlling and regulating the lay of the cement upon the applicator wheel or roller 28 also serves to maintain the cement below the upper surface of the housing 23 at least outwardly of the flanges 31 of said wheel. This prevents the possibility of cement coming in contact with any other part of the workpiece, it being understood that the sharp or bevelled edges of the flanges 31 will have but slight tendency to raise any appreciable amount of cement or other material. In fact, in the use of some materials, the edge 36a of the blade 36 may act as a wiper directly upon the inner surfaces of the flanges 31 by simply changing the contour of the edge 36a. The actual practice and function of the machine consists in laying a relatively thick ribbon of the cement on the workpiece in the area thereof which is disposed directly over the series 33 of teeth and by the action of saturation and spreading of this cement upon a workpiece, the same will extend laterally from this central portion to a point defined substantially by the two flanges 31, which in depressing the fibres of the workpiece to a slight degree, will form check walls checking further spreading of the cement.

It will also be understood that the roller 59 may be adjusted to regulate the position of the innermost flange 31 upon or with respect to the edge of the workpiece so as to leave an untreated margin at the edge of the workpiece which would be desirable on the soles of certain shoes and on other workpieces, and the width of this marginal edge may be determined by the adjustment of the roller 59 as well as its companion roller 60. It will be understood that in addition to applying cement to the soles of shoes to facilitate the attachment of other shoe parts or members thereto, for example in cementing the shoe upper to the sole, the same may be employed in cementing two workpieces of any kind and class together or in attaching by cementing one article or product to another article or product. Of course, the invention is particularly desirable in the application of a stripe or ribbon deposit of a suitable adhesive or in fact any other type of fluid material upon a suitable workpiece where the latter has an edge portion of irregular contour.

It will also be apparent that any type and kind of applicator and feed wheel or combination of feed wheels may be employed to suit different kinds and classes of workpieces. In Fig. 5 of the drawing, one other possible adaptation of the invention is shown wherein a feed and applicator wheel 65 is shown which differs from the wheel 28 simply in having a central circumferential continuous partition portion 66 intermediate the continuous bevelled side flange portions 67, the latter being equivalent to the flanges 31, and a series of circumferentially spaced teeth are employed at each side of the partition 66 as seen at 68 and 69. The partition 66 will be of the same or slightly less diameter than the flanges 67 whereas the teeth 68, 69, will be of less diameter than the partition 66 to form the applicator chambers. The use of a wheel such as illustrated at 65 will provide for the application of two parallel ribbon deposits of cement or similar material to the workpiece rather than the single deposit. However, in the single deposit, a heavier body of the cement is disposed centrally of the resulting ribbon than at the side edges of such ribbon; whereas with a structure similar to that shown in Fig. 5, two substantially heavy deposits of the cement will be disposed upon the workpiece, but the result would be otherwise substantially the same; that is to say, a single ribbon-like deposit of the cement will appear on the product with a spreading thereof to each side and intermediate the two narrow and heavier deposits as will be apparent.

In some types and kinds of workpieces, a series of teeth as at 32, 34, may be arranged to engage the surface of the workpiece to insure the feed thereof.

In referring to the heavier and thinner deposits of the material, I am, of course, dealing with cements such as are commonly employed in the shoe manufacturing industry. However, in other arts, the type and kind of cement employed may be varied or modified, as may also the lay of the cement or other material upon the surface of the workpiece. In some instances, no spreading whatever of the material will take place.

It will also appear from a consideration of Fig. 1 of the drawing that the upper surface of the housing 23 in which the wiper plate 36 is mounted is tapered or inclined downwardly to provide for free admission of the workpieces between the wheels or rollers 28, 49, to provide free movement of the workpiece between the rollers.

The feed rollers employed and one of which also forms an applicator roller may be said to operate to feed a workpiece in one direction through the machine; whereas the guide rollers, for example the rollers 59, 60, may be said to constitute means arranged in the path of the feed of the workpiece by said rollers so as to shift the workpiece transversely with respect to the feed rollers in the automatic feed of the workpiece in the machine to maintain said applicator roller in predetermined position with respect to the peripheral edge of the workpiece in maintaining a deposit of a material on the surface of the workpiece in parallelism to the edge thereof.

Having fully described my invention, what I claim as new and desire to secure by Letters Patent is:

1. In a machine for applying a deposit of fluid material upon the surface of a workpiece at one edge thereof, a pair of feed rollers between which a workpiece is adapted to be placed, means on one roller forming thereof an applicator for applying a fluid to the surface of the workpiece engaged thereby, means supporting the other roller in tensional engagement with the workpiece where engaged by the first named roller to support the same in firm engagement with the latter, guiding means cooperating with the peripheral edge of the workpiece in the feed of the workpiece through the machine by said rollers to maintain the lay of the fluid upon one surface of the workpiece by said first named applicator roller in parallelism to said edge of the workpiece, said last named means comprising a pair of freely rotating rollers engaging the edge of the workpiece in close proximity to said feed rollers, and means for independently adjusting each of said guide rollers longitudinally and transversely with respect to the normal path of feed of a workpiece between said feed rollers.

2. In a machine of the character described for applying a deposit of fluid-like material upon the surface of a workpiece adjacent the peripheral edge thereof, a pair of workpiece feeding rollers between which a workpiece is arranged and automatically fed in the rotation of said rollers, means whereby one of said rollers will operate to apply a fluid-like material to the surface of the workpiece engaged thereby, means associated with and arranged in close proximity to the first named rollers and in the path of movement of the workpiece therebetween for engaging the peripheral edge of the workpiece to automatically guide the workpiece between the first named rollers to maintain said applicator roller in predetermined spaced relationship to said edge of the workpiece regardless of the irregular contour of said edge of the workpiece, said last named means comprising freely rotatable guide rollers, and means for independently adjusting each of said guide rollers.

3. In a machine of the character described for applying a deposit of fluid-like material upon the surface of a workpiece adjacent the peripheral edge thereof, a pair of workpiece feeding rollers between which a workpiece is arranged and automatically fed in the rotation of said rollers, means whereby one of said rollers will operate to apply a fluid-like material to the surface of the workpiece engaged thereby, independently adjustable guide rollers associated with and arranged in close proximity to the first named rollers and in the path of movement of the workpiece therebetween for engaging the peripheral edge of the workpiece at spaced intervals to automatically guide the workpiece between the first named rollers to maintain said applicator roller in predetermined spaced relationship to said edge of the workpiece regardless of the irregular contour of said edge of the workpiece, an upwardly inclined adjustable plate having its upper end movable relatively to the applicator roller adjacent but in spaced relation to the workpiece to regulate the thickness of the lay of material on said workpiece.

4. In a machine for applying a ribbon-like deposit of cement to one surface of the sole of a shoe adjacent and paralleling the peripheral edge of said sole, a pair of feed rollers engaging opposed surfaces of the sole adjacent the peripheral edge thereof in direct opposed relationship to each other, one of said rollers forming an applicator roller, means supplying cement to said roller, said applicator roller having a large diameter flange at one end thereof and a small diameter flange at the other end thereof, said flanges defining the lay of the ribbon-like deposit of cement upon a workpiece, said roller having intermediate the flanges a plurality of annular circumferentially arranged tooth sections, at least two of which are of different diameters and all of less diameter than the first named flange of said roller, and said tooth sections serving to feed and deliver cement to the surface of the sole intermediate the flanged ends thereof.

5. In a machine for applying a ribbon-like deposit of cement to one surface of the sole of a shoe adjacent and paralleling the peripheral edge of said sole, a pair of feed rollers engaging opposed surfaces of the sole adjacent the peripheral edge thereof in direct opposed relationship to each other, one of said rollers forming an applicator roller, means supplying cement to said roller, said applicator roller having a large diameter flange at one end thereof and a small diameter flange at the other end thereof, said flanges defining the lay of the ribbon-like deposit of cement upon a workpiece, said roller having intermediate the flanges a plurality of annular circumferentially arranged tooth sections, at least two of which are of different diameters and all of less diameter than the first named flange of said roller, said tooth sections serving to feed and deliver cement to the surface of the sole intermediate the flanged ends thereof, and the diameter of the central tooth section of said roller being less than adjacent tooth sections to provide a heavier deposit of the cement centrally of said ribbon-like deposit.

6. In a machine for applying a ribbon-like deposit of cement to one surface of the sole of a shoe adjacent and paralleling the peripheral edge of said sole, a pair of feed rollers engaging opposed surfaces of the sole adjacent the peripheral edge thereof in direct opposed relationship to each other, one of said rollers forming an applicator roller, means supplying cement to said roller, said applicator roller having a large diameter flange at one end thereof and a small diameter flange at the other end thereof, said flanges defining the lay of the ribbon-like deposit of cement upon a workpiece, said roller having intermediate the flanges a plurality of annular circumferentially arranged tooth sections, at least two of which are of different diameters and all of less diameter than the first named flange of said roller, said tooth sections serving to feed and deliver cement to the surface of the sole intermediate the flanged ends thereof, and two independently adjustable workpiece guide rollers arranged adjacent the feed rollers to contact the peripheral edge of the sole to gauge the lay of the ribbon-like deposit of cement on the sole with respect to the peripheral edge thereof.

7. In a machine for applying a ribbon-like deposit of cement to one surface of the sole of a shoe adjacent and paralleling the peripheral edge of said sole, a pair of feed rollers engaging opposed surfaces of the sole adjacent the peripheral edge thereof in direct opposed relationship to each other, one of said rollers forming an applicator roller, means supplying cement to said roller, said applicator roller having a large diameter flange at one end thereof and a small diameter flange at the other end thereof, said flanges defining the lay of the ribbon-like deposit of cement upon a workpiece, said roller having intermediate the flanges a plurality of annular circumferentially arranged tooth sections, at least two of which are of different diameters and all of less diameter than the first named flange of said roller, said tooth sections serving to feed and deliver cement to the surface of the sole intermediate the flanged ends thereof, two independently adjustable workpiece guide rollers arranged adjacent the feed rollers to contact the peripheral edge of the sole to gage the lay of the ribbon-like deposit of cement on the sole with respect to the peripheral edge thereof, an upwardly inclined plate adjustable toward and from said applicator roller adjacent but in spaced relation to the sole fed between the feed rollers, and the upper end of said plate adjacent the applicator roller having a contour substantially conforming to the contour of the periphery of said applicator roller and controlling the delivery of cement to the surface of the sole by said applicator roller.

8. In a machine for applying a ribbon-like deposit of cement to the surface of a workpiece fed through the machine adjacent and paralleling one edge thereof, a pair of driven feed rollers engaging opposed surfaces of the workpiece adjacent the peripheral edge thereof, another pair of independently adjustable rollers guiding the peripheral edge of the workpiece to guide the workpiece with respect to said feed rollers, one of said feed rollers applying the cement to the workpiece from a source of supply maintained adjacent said roller, said applicator roller having circumferential continuous and relatively sharp end flanges defining marginal lines of the ribbon-like deposit of cement upon the surface of the workpiece, and a series of annular tooth-like sections intermediate the flanges and of less diameter than at least one of said flanges forming means feeding and applying cement to the surface of the workpiece intermediate said flanges.

ALEXANDER SOLTAN.